United States Patent
Freakes et al.

(10) Patent No.: US 6,865,950 B2
(45) Date of Patent: Mar. 15, 2005

(54) PRESSURE MONITOR INCORPORATING SAW DEVICE

(75) Inventors: Graham Michael Freakes, Lancaster (GB); David Daniel George Vile, Bicester (GB); Victor Alexandrovich Kalinin, Headington (GB); Peter John Beckley, Cowley (GB); Arthur John Leigh, Banbury (GB)

(73) Assignee: Transense Technologies PLC (FR)

( * ) Notice: Subject to any disclaimer, the term of this patent is extended or adjusted under 35 U.S.C. 154(b) by 0 days.

(21) Appl. No.: 10/398,083

(22) PCT Filed: Oct. 10, 2001

(86) PCT No.: PCT/GB01/04519

§ 371 (c)(1),
(2), (4) Date: Apr. 2, 2003

(87) PCT Pub. No.: WO02/31461

PCT Pub. Date: Apr. 18, 2002

(65) Prior Publication Data

US 2004/0020299 A1 Feb. 5, 2004

(30) Foreign Application Priority Data

Oct. 10, 2001 (GB) .............................................. 0024813

(51) Int. Cl.[7] ............................................... G01L 11/00
(52) U.S. Cl. .............................. 73/702; 73/708; 73/715
(58) Field of Search .................................. 73/700–756

(56) References Cited

U.S. PATENT DOCUMENTS 3,878,477 A    4/1975  Dias et al.

6,535,460 B2 * 3/2003 Loeppert et al. ............. 367/181

FOREIGN PATENT DOCUMENTS

| GB | 2 235 533 | 3/1991 |
|---|---|---|
| GB | 2 352 814 | 2/2001 |
| GB | 2 361 318 | 10/2001 |
| WO | WO 01/07271 | 2/2001 |

* cited by examiner

*Primary Examiner*—Edward Lefkowitz
*Assistant Examiner*—Jermaine Jenkins
(74) *Attorney, Agent, or Firm*—Keusey, Tutunjian & Bitetto, P.C.

(57) ABSTRACT

A pressure monitoring device includes a rigid base (2) which has secured thereto a lid (5) to define a hermetically sealed chamber (6). The lid (5) is of flexible metal material and the major surface (5A) of the lid forms a diaphragm which will deflect in response to changes in the pressure surrounding the device. A substrate (7) upon which a plurality of SAW devices are laid down is supported on a rigid frame (3A) of the base so that the central region thereof is unsupported between edges (11, 12). A dimple (10) is formed in the lid (5) and presses on a central region of the substrate (7). Changes in pressure will accordingly cause distortion of the central region of the substrate. The end regions (8, 9) of the substrate (7) carry further SAW devices so that, by analyzing the changes in characteristics of all the SAW devices a temperature compensated indication of pressure change, together with an indication of absolute temperature, may be provided by interrogating the SAW devices. The base (2) and the lid (5) are preferably both of metal alloy and may be secured together by soldering. Antennae associated with the SAW devices may be laid down as tracks on the surface of the base (2).

19 Claims, 2 Drawing Sheets

PRESSURE MONITOR INCORPORATING SAW DEVICE

FIELD OF THE INVENTION

This invention relates to a pressure monitor incorporating a SAW device.

DESCRIPTION OF RELATED ART

Pressure monitors incorporating SAW devices have been proposed, for example in our United Kingdom patent application GB-A-2352814. The SAW devices are used to produce an electrical signal indicative of the position of a pressure sensitive member, for example a diaphragm, which is used to divide a chamber containing a reference pressure from a chamber which is subject to a variable pressure. The present invention relates to an improved pressure monitor of this type.

SUMMARY OF THE INVENTION

In accordance with the first aspect of the present invention a pressure monitor comprises: a base having a rigid frame; a lid secured to the base to define with the base a substantially fluid tight chamber, at least part of the lid being flexible and forming a diaphragm which will deflect in response to changes in the fluid pressure surrounding the monitor; at least one SAW device supported within the chamber; and means remote from the edge of the frame for transmitting movement of the diaphragm to the SAW device whereby movement of the diaphragm induced by a change in pressure in the zone surrounding the monitor will result in distortion of the SAW device.

The SAW device may be of the resonator type in which case the distortion of the SAW device may be measured by measuring the change in resonant frequency produced by the distortion, or may be of the delay line type in which case the distortion of the SAW device may be measured by measuring the change in delay characteristics produced by the distortion. Accordingly, changes in the pressure to which the monitor is subjected may be determined by observing the changes in the characteristics of the SAW device.

In a particularly preferred embodiment of the invention the SAW device is supported by the frame and extends along the length of the chamber enclosed by the rigid frame and the lid. Accordingly, deflection of the lid acting as a diaphragm will cause bending of the SAW device with a resulting change in output of the SAW device.

Preferably, three SAW resonator devices are provided having different resonance frequencies so that by analysis of the frequency shifts produced by distortion of one of the SAW devices a temperature compensated indication of the distortion of the SAW device and accordingly the displacement of the diaphragm may be obtained, together with an indication of temperature of the SAW device. The three SAW devices may be located on the same side of a common substrate or two may be located on one side of a common substrate and the other located on the opposite side of the common substrate. Alternatively, two individual substrates, one carrying two SAW devices (on the same or respective opposite sides thereof) and one carrying one SAW device, or indeed three individual substrates each carrying one SAW device, may be provided. If more than one substrate is provided the arrangement may be such that one SAW device is subjected to strain from the deflection of the lid and the other two SAW devices are unstrained providing references for pressure and temperature measurement.

In the preferred embodiment of the invention the means remote from the edge of the frame for transmitting movement of the diaphragm to the SAW device comprises one or more bumps provided on the lid which can press on the substrate of a SAW device but which cannot exert a pulling force on the SAW device. The or each bump may be provided by a depression formed in the material of the lid or by means of a suitable member secured to the lid.

In one embodiment, the chamber is hermetically sealed with a reference pressure. The reference pressure is selected so that when the device is located within the zone in which it is to operate, the pressure surrounding the device is higher than the reference pressure with a result that the diaphragm will deflect inwardly of the base and exert a force on the or one of the SAW devices.

Preferably, the base is a ceramic or metal base to which the lid is secured.

In one embodiment of the invention a single sided SAW device is mounted face down supported by the base with the diaphragm bump pressing from the back and a second substrate is mounted in an unstrained area and carries two reference SAW devices (one for pressure and one for temperature). According to a further embodiment of the invention a double sided SAW device is used to detect pressure transmitted by two bumps and a reference SAW device is mounted in an unstrained location in the chamber for temperature reference information.

According to a second aspect of the invention a pressure monitor comprises: a base having a rigid frame; a lid acting as a diaphragm secured to the rigid frame to define with the base a substantially fluid tight chamber, the diaphragm having at least one indentation formed therein to define at least one ridge projecting into the chamber; and at least one SAW device mounted within the chamber and secured to the ridge.

Preferably the lid has at least two indentations formed therein to form two corresponding ridges to which the substrate of a SAW device is attached. Preferably, the or each SAW device is secured to the lid by a bonding process, for example using solder.

Preferably, at least two SAW devices are provided so that temperature compensated measures of pressure can be attained. The two SAW devices may be respectively mounted on one side of two substrates, or on the opposite sides of one substrate. If two substrates are provided, the lid preferably includes three indentations whereby the two substrates may each be supported along one edge by a common ridge and along an opposite edge by a respective ridge. Preferably, the substrates extend side by side along the lid.

In order to provide the desired temperature compensated indication of pressure changes two SAW devices are preferably provided, one being deformed in compression and one being deformed in tension by movement of the lid. The SAW devices may be laid down on the opposite sides of a common substrate or on separate substrates. If separate substrates are used they should be arranged so that simultaneously one SAW device is deformed in compression and one SAW device is deformed in tension.

Preferably, the lid acting as a diaphragm includes a metal alloy, for example an iron, cobalt, nickel alloy. For example the lid may be of Kovar. The base is preferably of a metal alloy (for example Kovar) but may be of any suitable material, for example a ceramic material.

BRIEF DESCRIPTION OF THE DRAWINGS

The invention will be better understood from the following description of preferred embodiments thereof, given by way of example only, reference being had to the accompanying drawings wherein.

DETAILED DESCRIPTION OF PREFERRED EMBODIMENTS

Figure 1A:
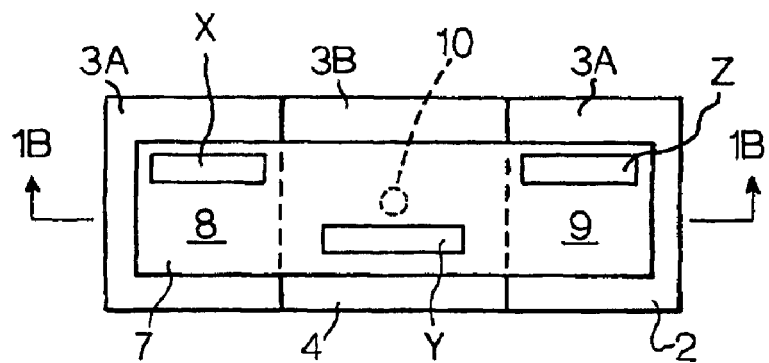
FIG. 1A is a schematic plan view of a first embodiment of the invention, before application of the lid.
Figure 1B:
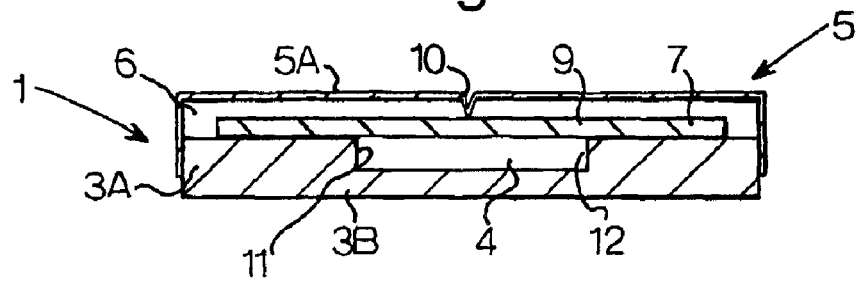
FIG. 1B is a schematic cross sectional view of the first embodiment of the invention along the line 1B—1B of FIG. 1A, with the lid in place.

Referring firstly to FIGS. 1A and 1B, there is shown schematically a pressure monitor 1 comprising a base 2 having rigid frame 3A and a rigid base 3B which together define a shallow rectangular container 4. The container 4 may be formed of any suitable material, and in the preferred embodiment of the invention is formed of a metal material, for example Kovar. The container 4 has secured to the open end thereof a lid 5 having a major surface 5A acting as a diaphragm. The lid may be of any suitable material, for example Kovar. Both the material from which the base is made and the material from which the lid acting as a diaphragm is made are preferably impermeable to gas and the seal between the lid and the base is also preferably impermeable to gas. The seal between the lid in the base may be formed by any convenient means. If both the lid and the base are of suitable metal alloys the seal therebetween may be formed by a soldering process. When the lid 5 acting as a diaphragm is secured to the base 4 a sealed chamber 6 is defined by the lid and the base. The absolute pressure contained within the chamber 6 is determined at the time of manufacture in light of the pressure conditions to which the device is to be sensitive. If, for example, the device is intended to monitor the pressure within a vehicle tire it will typically operate within a zone having pressure of two to ten bar and under these circumstances the pressure sealed within the chamber 6 may, for example be one bar at a temperature of 20° C. Alternatively, a vacuum may be sealed in the chamber 6 to provide absolute pressure readings.

Mounted within the chamber 6 is a single substrate 7 which has formed thereon three SAW devices X, Y, Z to provide a temperature compensated pressure and temperature monitoring output. The SAW devices may, for example, be SAW resonators having different resonant frequencies so that the changes in the resonant frequencies of the respective SAW devices may be determined using existing conventional SAW device interrogating technology.

The substrate 7 is supported by the base 2 and for convenience may be secured to the base by means of a flexible adhesive. If adhesive is used to secure the substrate in position, the flexibility of the adhesive should be such that the respective end regions 8, 9 of the substrate 7 are free to move as substrate 7 is acted upon by a projection 10 formed integrally with or secured to the lid 5. Accordingly the end regions 8, 9 will be substantially unstrained even when the central region is strained as a result of movement of the diaphragm.

The lid 5 is provided, in the center of the major surface 5A, with a projection 10 formed by a dimple pressed in the material of the lid. The position of the projection 10 is shown in broken line in FIG. 1A. The projection 10 is able to exert a downward force (as viewed in FIG. 1B) at the center of the substrate, but is unable to exert a force on ends 8, 9.

Suitable antennae are provided for receiving an excitation signal for each of the SAW devices X, Y, Z and for transmitting a response signal from each of the SAW devices. The antennae may be located on the exterior of the container 4 in which case appropriate electrical connections must be provided extending through the material of the container 4. Alternatively, it may be possible to lay the antennae down as tracks on the interior surface of the container 4 or on suitable areas of the substrate 7 not occupied by the SAW devices themselves.

In use, a pressure monitor as described above is placed within a zone the pressure of which is to be monitored. The pressure monitor is chosen in light of the pressures to which it is intended to be sensitive, and in particular, the absolute pressure sealed within the chamber 6 is chosen so that the diaphragm is deflected towards the base 3B by the pressure prevailing in the region to which the device is sensitive. This defection of the diaphragm will cause bending of the substrate 7 only between the edges 11, 12 of the frame 3A and accordingly a change in the resonant frequency of the central SAW device Y. The resonant frequency of the SAW devices may be determined by known techniques to calibrate the monitoring device.

If there is a change in pressure in the zone surrounding the device this will result in a movement of the lid 5 acting as a diaphragm. An increase in pressure will result in movement of the diaphragm towards the base 3B and a reduction in pressure will cause a movement of the diaphragm away from the base 3B. Either change will result in a change in the bending of the substrate 7 with a resultant change in the resonant frequency of the central SAW device Y. By monitoring the changes in resonant frequency of the SAW devices an indication may be provided of the change in pressure. The device may, for example, be located within a vehicle tire to provide a remote indication of a loss of pressure within the vehicle tire.

The embodiment of FIG. 1 is particularly desirable in that one substrate 7 is provided and accordingly SAW devices may be provided on one surface only.

It will be noted that the above described embodiment of the invention is particularly simple to fabricate and comprises in essence, only four elements, namely the base 2, the substrate 7 (with its associated SAW devices), the lid 5 and appropriate antennae (not shown). The components may be assembled under factory conditions by means of a simple and logical progression, namely the antennae may be laid down as suitable tracks on the base 2 and connected to the antennae, and finally the lid 5 may be secured to the base to complete the unit. The simple assembly techniques offer substantial practical advantages for a mass produced unit to be used in relatively low cost applications such as monitoring the pressure within vehicle tires. The unit, once produced, is completely self-contained and merely requires to be secured in position. Securing the unit in position may be effected by semi skilled or unskilled labor within a factory environment.

Figure 2A:
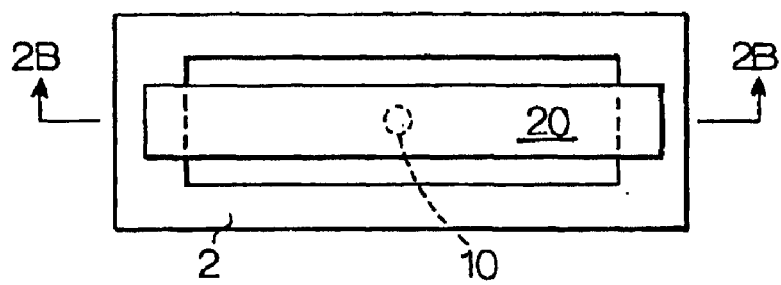
FIG. 2A is a schematic view corresponding to FIG. 1A, but showing a second embodiment of the invention.
Figure 2B:
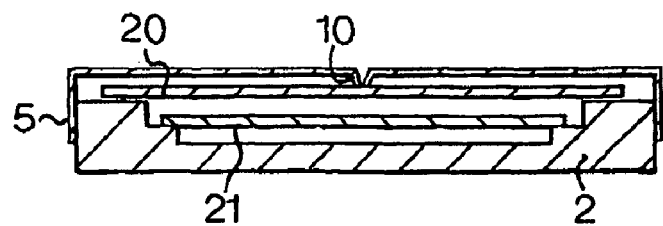
FIG. 2B is a schematic cross sectional view of the second embodiment of the invention along the line 2B—2B of FIG. 2A, with the lid in place.

In the second embodiment of FIG. 2 two substrates 20, 21 are provided instead of the single substrate 7 of FIG. 1, and at least two SAW devices are provided on the lower unstrained substrate 21. In other respects, the components in operation of the embodiment of FIG. 2 are substantially the same as those of the embodiment of FIG. 1. As in the case of the embodiment of FIG. 1, the substrates 20, 21 may conveniently be held in position by means of flexible adhesive.

Figure 3A:
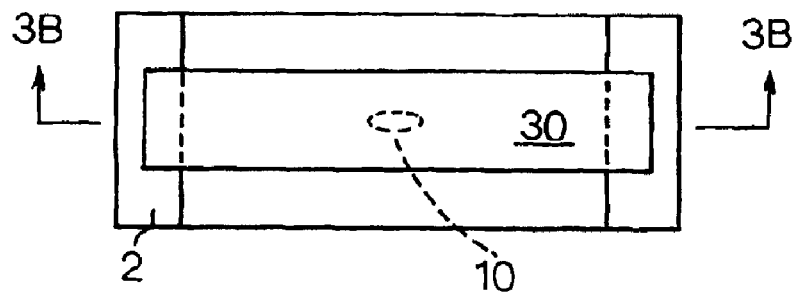
FIG. 3A is a schematic view corresponding to FIG. 1A, but showing a third embodiment of the invention.
Figure 3B:
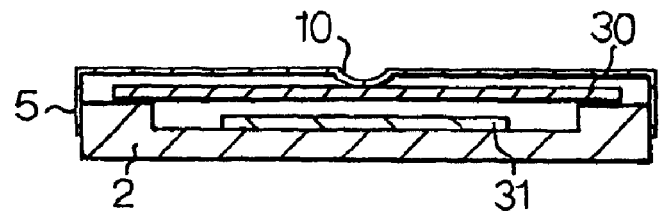
FIG. 3B is a schematic cross sectional view of the third embodiment of the invention along the line 3B—3B of FIG. 3A, with the lid in place.

In the third embodiment (FIG. 3) two substrates 30, 31 are provided and two SAW devices are provided on opposite sides of the upper strained substrate 30. In other respects, the components in operation of the embodiment of FIG. 3 are the same as those of the embodiment of FIG. 1.

Figure 4A:
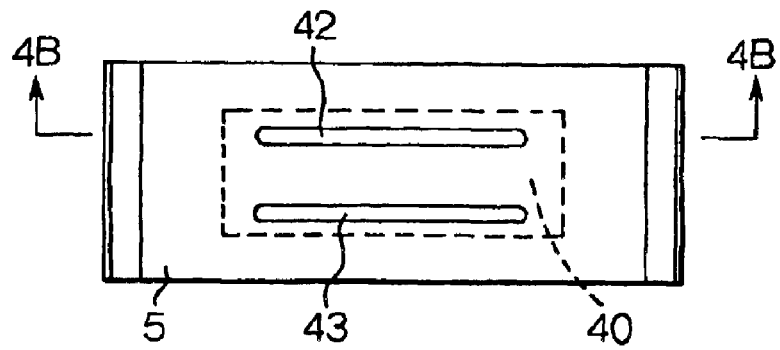
FIG. 4A is a schematic plan view showing a fourth embodiment of the invention.
Figure 4B:
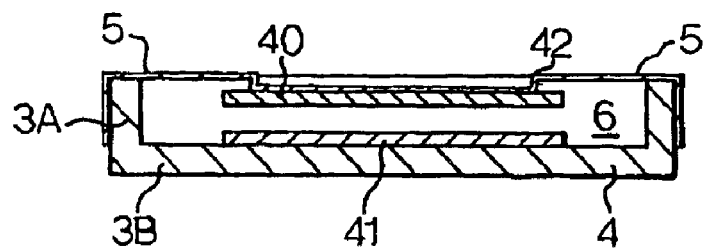
FIG. 4B is a schematic cross sectional view of the fourth embodiment of the invention along the line 4B—4B of FIG. 4A.

Referring now to FIGS. 4, a further embodiment of the invention is shown. As in the case of the embodiment of FIGS. 1–3 the device comprises a container 4 which is of ceramic or metal material. The container 4 comprises a rigid frame 3A and a base B. The open mouth of the container is closed by a lid 5 acting as a diaphragm to define a hermetically sealed chamber 6. In the case of this embodiment a SAW device substrate 40 to detect changes in deflection of the diaphragm 5 is secured to the diaphragm itself. To this end, pressed indentations 42, 43 are provided in the diaphragm. The indentations 42, 43 define ridges within the chamber 6 to which the substrate 40 is secured, for example by soldering. The substrate 40 has mounted thereon one or more SAW devices. A further substrate 41 is mounted on the unstrained area of the chamber 6 As will be appreciated by those skilled in the art, at least two SAW devices are required to provide a pressure indication which is temperature compensated and three SAW devices are required to provide pressure and temperature monitoring capabilities.

In the case of embodiments of FIGS. 4, deformation of the lid 5 acting as a diaphragm caused by pressure changes will result directly in deformation of the substrate, 40 with a resulting change in the resonant frequency of the SAW devices mounted thereon. Antennae for the SAW devices may be provided by any convenient means, for example electrically conducted track provided on the surface of the container 4 or electrical connections to external antennae passing through the container 4.

What is claimed is:

1. A pressure monitor comprising a base having a rigid frame; a lid secured to the base to define with the base a substantially fluid tight chamber, at least part of the lid being flexible and forming a diaphragm which will deflect in response to changes in the fluid pressure surrounding the monitor, at least one surface acoustic wave (SAW) device supported within the chamber; an means remote from the edge of the frame for transmitting movement of the diaphragm to the SAW device whereby movement of the diaphragm induced by a change in pressure in a zone surrounding the monitor will result in distortion of the SAW device; and the SAW device comprising surface elements laid down on a substrate, the substrate having, in addition to the zone thereof which is subject to distortion by movement of the diaphragm, at least one other region which is not subject to substantial distortion as a result of movement of the diaphragm, and upon which at least one further set of surface elements are laid down to form at least one further SAW device to provide temperature compensation to the output of the monitor.

2. A pressure monitor according to claim 1 wherein three SAW devices are provided whereby the monitor provides a temperature compensated indication of pressure changes, together with an indication of the temperature of the monitor.

3. A pressure monitor according to claim 1 wherein the means for transmitting movement of the diaphragm to the SAW device comprises a projection extending from a major surface of the lid.

4. A pressure monitor according to claim 3 wherein the projection is formed by deforming material of the lid.

5. A pressure monitor according to claim 1 wherein at least one antenna for providing radio communication to the SAW device is laid down on a surface of the base.

6. A pressure monitor according to claim 1 wherein the lid is of a metal or metal alloy and is secured to the base by soldering.

7. A pressure monitor according to claim 1 wherein the chamber is hermetically sealed and includes a gas at a pre-determined absolute pressure.

8. A pressure monitor according to claim 1 including a plurality of SAW devices provided on a plurality of substrates, at least one of the substrates being secured to the base in a manner which is not the subject to distortion as a result of movement of the diaphragm.

9. A pressure monitor according to claim 1 wherein the substrate of the at least one SAW device is secured to the base by means of a flexible adhesive.

10. A pressure monitor comprising a base having a rigid frame; a lid acting as a diaphragm secured to the rigid frame to define with the base a substantially fluid tight chamber, the diaphragm having at least one indentation formed therein to define at least one ridge projecting into the chamber; and at least one SAW device mounted within the chamber and secured to the ridge, wherein the at least one SAW device includes three SAW devices whereby the monitor provides a temperature compensated indication of pressure changes, together with an indication of the temperature of the monitor.

11. A pressure monitor according to claim 10 comprising a substantially fluid tight chamber having a lid forming a diaphragm which deflects in response to changes in the fluid pressure surrounding the monitor; the at least one surface acoustic wave (SAW) device supported within the chamber; and means for transmitting movement of the diaphragm to the at least one SAW device whereby movement of the diaphragm induced by a change in pressure in a zone surrounding the monitor results in distortion of the at least one SAW device.

12. A pressure monitor according to claim 10 wherein the at least one SAW device comprises surface elements laid down on a substrate, the substrate having at least one region which is not subject to substantial distortion as a result of movement of the diaphragm, and upon which at least one further set of surface elements are laid down to form at least one of the SAW devices to provide temperature compensation to the output of the monitor.

13. A pressure monitor according to claim 12, wherein the plurality of SAW devices are provided on a plurality of substrates and includes at least one of the substrates being secured in a manner which is not the subject to distortion as a result of movement of the diaphragm.

14. A pressure monitor according to claim 12 wherein the substrate of the at least one SAW device is secured to the base by means of a flexible adhesive.

15. A pressure monitor according to claim 11 wherein the means for transmitting movement of the diaphragm to the at least one SAW device comprises a projection extending from a major surface of the lid.

16. A pressure monitor according to claim 15 wherein the projection is formed by deforming material of the lid.

17. A pressure monitor according to claim 10 wherein the lid is of a metal or metal alloy and is secured to the base by soldering.

18. A pressure monitor according to claim 10 wherein the chamber is hermetically sealed and includes a gas at a pre-determined absolute pressure.

19. A pressure monitor comprising:

a base having a rigid frame;

a lid secured to the base to define with the base a substantially fluid tight chamber, at least part of the lid being flexible and forming a diaphragm which will deflect in response to changes in the fluid pressure surrounding the monitor;

a plurality of surface acoustic wave (SAW) devices provided on a plurality of substrates supported within the chamber;

means remote from the edge of the frame for transmitting movement of the diaphragm to the SAW device whereby movement of the diaphragm induced by a change in pressure in a zone surrounding the monitor will result in distortion of at least one the SAW devices; and at least one of the substrates being secured to the base in a manner which is not the subject to distortion as a result of movement of the diaphragm.

* * * * *